United States Patent
McCarthy (10) Patent No.: US 12,118,855 B2
(45) Date of Patent: Oct. 15, 2024

(54) METHOD AND SYSTEMS FOR SELECTING A WINNER OF A COMPETITION

(71) Applicant: Mike McCarthy, Wayne, PA (US)

(72) Inventor: Mike McCarthy, Wayne, PA (US)

( * ) Notice: Subject to any disclaimer, the term of this patent is extended or adjusted under 35 U.S.C. 154(b) by 294 days.

(21) Appl. No.: 17/534,908

(22) Filed: Nov. 24, 2021

(65) Prior Publication Data
US 2022/0165134 A1 May 26, 2022

Related U.S. Application Data

(60) Provisional application No. 63/117,008, filed on Nov. 23, 2020.

(51) Int. Cl.
*G07F 17/32* (2006.01)
*H04L 9/08* (2006.01)
*H04L 9/32* (2006.01)
*H04L 9/00* (2022.01)

(52) U.S. Cl.
CPC ........ *G07F 17/3276* (2013.01); *H04L 9/0869* (2013.01); *H04L 9/3239* (2013.01); *H04L 9/3297* (2013.01); *H04L 9/50* (2022.05)

(58) Field of Classification Search
None
See application file for complete search history.

(56) References Cited

U.S. PATENT DOCUMENTS

2013/0346170 A1* 12/2013 Epstein .............. G06Q 30/0226
705/14.14
2019/0205773 A1* 7/2019 Ackerman ............. H03K 19/18

OTHER PUBLICATIONS

BitZino, bitZino is Provably Fair.

* cited by examiner

*Primary Examiner* — Sunit Pandya
(74) *Attorney, Agent, or Firm* — Lambert Shortell & Connaughton; David J. Connaughton; Justin P. Tinger (57) ABSTRACT

The present disclosure provides a method for randomly selecting a winner from a group of participants which is verifiably random, removing the requirement of a trusted third party in competitions such as lotteries. Also provided are processing systems and architectures for implementing the method.

18 Claims, 7 Drawing Sheets

```
┌─────────────────────────────────────────────────────────────────────────────┐
│ Receive a competition request comprising one or more competition parameters │
│ including a start date parameter and a run-time parameter                   │
│                                                                         102 │
└─────────────────────────────────────────────────────────────────────────────┘
                                      ↓
┌─────────────────────────────────────────────────────────────────────────────┐
│ Generate a verification string by taking the hash of a cryptographic nonce  │
│ comprising zero or more characters appended to a server seed                │
│                                                                         104 │
└─────────────────────────────────────────────────────────────────────────────┘
                                      ↓
┌─────────────────────────────────────────────────────────────────────────────┐
│ Create a certificate of validity comprising the verification string         │
│                                                                         106 │
└─────────────────────────────────────────────────────────────────────────────┘
                                      ↓
┌─────────────────────────────────────────────────────────────────────────────┐
│ Publish the certificate of validity on a public register                    │
│                                                                         108 │
└─────────────────────────────────────────────────────────────────────────────┘
                                      ↓
┌─────────────────────────────────────────────────────────────────────────────┐
│ Determine that an amount of time equal to the run-time parameter has        │
│ elapsed since the start time                                                │
│                                                                         110 │
└─────────────────────────────────────────────────────────────────────────────┘
                                      ↓
┌─────────────────────────────────────────────────────────────────────────────┐
│ In response to the determination, request user data for one or more         │
│ competition participants                                                    │
│                                                                         112 │
└─────────────────────────────────────────────────────────────────────────────┘
                                      ↓
┌─────────────────────────────────────────────────────────────────────────────┐
│ Assign each of the one or more competition participants an integer          │
│                                                                         114 │
└─────────────────────────────────────────────────────────────────────────────┘
                                      ↓
┌─────────────────────────────────────────────────────────────────────────────┐
│ Generate a determination string by taking the hash of a client seed created │
│ based on the user data for the one or more competition participants         │
│ appended to the server seed                                                 │
│                                                                         116 │
└─────────────────────────────────────────────────────────────────────────────┘
                                      ↓
┌─────────────────────────────────────────────────────────────────────────────┐
│ Calculate an determination integer based on the determination string        │
│                                                                         118 │
└─────────────────────────────────────────────────────────────────────────────┘
                                      ↓
┌─────────────────────────────────────────────────────────────────────────────┐
│ Select a participant having an assigned integer corresponding to the        │
│ determination integer as the winner of the competition                      │
│                                                                         120 │
└─────────────────────────────────────────────────────────────────────────────┘
                                      ↓
┌─────────────────────────────────────────────────────────────────────────────┐
│ Add the user data of the winner of the competition to the certificate of    │
│ validity                                                                    │
│                                                                         122 │
└─────────────────────────────────────────────────────────────────────────────┘
```

FIG.1

| | |
|---|---|
| Initial Random State | 9ee639245fdb4655a10468c06ac5ff28909e50b67d57b10aa57b70912a20efe4902d143ed4<br>1df4dcff3f117661c35295d444369520ae9d2a6d2b6b33061314974c77984e3df1f2ef65af7e<br>284322c436966d2b615288330f83d54a8e22467de6b21e9e271ede9d1dcbc91ece684e6d<br>7a27427b0925d65cd54d837e9e62a71015b65b053281e1f8aac0bdbbee7d6bb878dd3234<br>c1fd3c00babc4d0138d0527d22268474952980ebbe7c500ae655952a004fe7e6ccf643b7d<br>83e07610f9f3dbaaeb1f35e211525f477b504da23d3671ae66370260af562ee8ae1edacef1<br>952de1b5030c751c39bc115e4edeaee44be42c745fdabcb5904dab071c5c0da8d843f4aa2<br>b9b313cb2eb7292cbd268a7b3ab3391908f49dc5081d4e37809dd73a9c6f9053bd04bdce1<br>0334eaf8fe664ec95d91a6ad37453d411caa48baabe6a880b7bafe31819c143441e504ac3<br>ebd57f6baced810af569fafb28096c108a2f9a9f8e1896db56c09f9c4d2733e734755e0de9e<br>4e9cb27089174764ddb41c3473df4acefbf1c24b3e7fa08ca7d69f44b1801cf05b9d3c5b9ed<br>7f4e99ec7c8371b00dbf62495cf42a1d75c1c8838f4bafdbea408a17c5b69f4a2fb30c162db2<br>972c8d44e114187a5d9cf1ab48335ea97794fa4c761e02e7730b28e503aef0b77788c70e5<br>af8d6bfbde2f8712584eecd3d5669ec609573da8fcf7e0c19e7785b7aebef2587e208fe09bd<br>0077223de754c5d53e0aab15c43dfacf18641fbebd32c8a89b37b2cb6567ba68190c17592<br>2ddf4566482cedef6c7a3539c09b612fe733f6f6b685c9abeadce4ecc87769eba84959617b8<br>8c4674029d038237a75c82fe32c0fcf53f6877a1e81736617f34733a96543dd8ee13b3ace7<br>37a2bce071efc0ab1b96d2bbc2cdb95132adbfd77fbc411f1b5280ac762cf425c58d0951988<br>8ec56fb433d4cfe39093bd96835b6083e045ecf7c623c0e7b2592428cd307e3c1215ef8dd3<br>2b35a1cce8252fca5e037c2227eb9de77b99ff2aa23998a0b7fcec08f9108f588bf8e941291<br>2f5b8552e76c568d1eb68fad482faf6318ece89cd6013d0dfd245067f18b5720eb3b237d527<br>6b1518b3e6b44e1e4fab15a6ae8216bc79b80926541079f89256c52f568fe3507aa50f80b3<br>abff0627d7ad9a44cc39ea5d2eecbc1ccf98eada23799cb35194cdc763775893101315764d<br>00b27275ff09ba4b5d2649153b47bb18d09de0b9f8cf71062a31ea92c69208dcd94d2585dd<br>5ccb0b07326bce47fda7b926aea14ac2fb437150ec0ed9731640b40231d04d97cefbfdd286<br>6742f27a7d7a659954a4ca28ebff97facc2c9646ddcb291f4ff746bdd4b9c895f9146e6cc59c<br>89047571fae62a5d1d2ce56b9d32b137f09d193506f4c0b0b619307ce14cd2f7428acf2fbe5<br>18ba92f3674cbdab7f1fba0fb0e60f528cccec8ce78883b |
| Server Seed | MSN4xiuOi5 |
| Initial Random State + "." + Server Seed | 9ee639245fdb4655a10468c06ac5ff28909e50b67d57b10aa57b70912a20efe4902d143ed4<br>1df4dcff3f117661c35295d444369520ae9d2a6d2b6b33061314974c77984e3df1f2ef65af7e<br>284322c436966d2b615288330f83d54a8e22467de6b21e9e271ede9d1dcbc91ece684e6d<br>7a27427b0925d65cd54d837e9e62a71015b65b053281e1f8aac0bdbbee7d6bb878dd3234<br>c1fd3c00babc4d0138d0527d22268474952980ebbe7c500ae655952a004fe7e6ccf643b7d<br>83e07610f9f3dbaaeb1f35e211525f477b504da23d3671ae66370260af562ee8ae1edacef1<br>952de1b5030c751c39bc115e4edeaee44be42c745fdabcb5904dab071c5c0da8d843f4aa2<br>b9b313cb2eb7292cbd268a7b3ab3391908f49dc5081d4e37809dd73a9c6f9053bd04bdce1<br>0334eaf8fe664ec95d91a6ad37453d411caa48baabe6a880b7bafe31819c143441e504ac3<br>ebd57f6baced810af569fafb28096c108a2f9a9f8e1896db56c09f9c4d2733e734755e0de9e<br>4e9cb27089174764ddb41c3473df4acefbf1c24b3e7fa08ca7d69f44b1801cf05b9d3c5b9ed<br>7f4e99ec7c8371b00dbf62495cf42a1d75c1c8838f4bafdbea408a17c5b69f4a2fb30c162db2<br>972c8d44e114187a5d9cf1ab48335ea97794fa4c761e02e7730b28e503aef0b77788c70e5<br>af8d6bfbde2f8712584eecd3d5669ec609573da8fcf7e0c18e7785b7aebef2587e208fe09bd<br>0077223de754c5d53e0aab15c43dfacf18641fbebd32c8a89b37b2cb6567ba68190c17592<br>2ddf4566482cedef6c7a3539c09b612fe733f6f6b685c9abeadce4ecc87769eba84959617b8<br>8c4674029d038237a75c82fe32c0fcf53f6877a1e81736617f34733a96543dd8ee13b3ace7<br>37a2bce071efc0ab1b96d2bbc2cdb95132adbfd77fbc411f1b5280ac762cf425c58d0951988<br>8ec56fb433d4cfe39093bd96835b6083e045ecf7c623c0e7b2592428cd307e3c1215ef8dd3<br>2b35a1cce8252fca5e037c2227eb9de77b99ff2aa23998a0b7fcec08f9108f588bf8e941291<br>2f5b8552e76c568d1eb68fad482faf6318ece89cd6013d0dfd245067f18b5720eb3b237d527<br>6b1518b3e6b44e1e4fab15a6ae8216bc79b80926541079f89256c52f568fe3507aa50f80b3<br>abff0627d7ad9a44cc39ea5d2eecbc1ccf98eada23799cb35194cdc763775893101315764d<br>00b27275ff09ba4b5d2649153b47bb18d09de0b9f8cf71062a31ea92c69208dcd94d2585dd<br>5ccb0b07326bce47fda7b926aea14ac2fb437150ec0ed9731640b40231d04d97cefbfdd286<br>6742f27a7d7a659954a4ca28ebff97facc2c9646ddcb291f4ff746bdd4b9c895f9146e6cc59c<br>89047571fae62a5d1d2ce56b9d32b137f09d193506f4c0b0b619307ce14cd2f7428acf2fbe5<br>18ba92f3674cbdab7f1fba0fb0e60f528cccec8ce78883b.MSN4xiuOi5 |
| Verification String | 01dda83b1ae021c395b5db6f4c8682e4f090304383ad246afe32ee81245aa<br>aa3d5c11c0f17e2495a66266c00f0976154f25f085ffd500103a789c578ee79<br>19bc |

FIG.2

| Users |
|---|
| alannale |
| teodoroschoenborn |
| cristenwadman |
| normahackbarth |
| yasminemccormick |
| geraldinewoolverton |
| jaunitaduwe |
| farrahcampagna |
| evettemcelyea |
| leonoredalley |
| ethelenebarrow |
| tommyoverfield |
| vannessapryce |
| carisapascal |
| alysemarcy |
| rafaelalatson |
| bellwasher |
| kipalthaus |
| zenobiabragg |
| gwenzastrow |

302

→

| Index | User |
|---|---|
| 0 | alannale |
| 1 | alysemarcy |
| 2 | bellwasher |
| 3 | carisapascal |
| 4 | cristenwadman |
| 5 | ethelenebarrow |
| 6 | evettemcelyea |
| 7 | farrahcampagna |
| 8 | geraldinewoolverton |
| 9 | gwenzastrow |
| 10 | jaunitaduwe |
| 11 | kipalthaus |
| 12 | leonoredalley |
| 13 | normahackbarth |
| 14 | rafaelalatson |
| 15 | teodoroschoenborn |
| 16 | tommyoverfield |
| 17 | vannessapryce |
| 18 | yasminemccormick |
| 19 | zenobiabragg |

| Client Seed | alannalealysemarcybellwashercarisapascalcristenwadmanethelenebarrowevettemcelyeafarrahcampagnageraldinewoolvertongwenzastrowjaunitaduwekipalthausleonoredalleynormahackbarthrafaelalatsonteodoroschoenborntommyoverfieldvannessapryceyasminemccormickzenobiabragg |
|---|---|

FIG.4

| Client Seed + "-" + Server Seed | Alannalealysemarcybellwashercarisapascalcristenwadmanethelenebarrowevettemcelyeafarrahcampagnageraldinewoolvertongwenzastrowjaunitaduwekipalthausleonoredalleynormahackbarthrafaelalatsonteodoroschoenborntommyoverfieldvannessapryceyasminemccormickzenobiabragg-MSN4xiuOi5 |
|---|---|
| Determination String | d1d8e29857a1c89d80ed3701195976e4e044b18dc4df45afbb6d4978d050944089f3f965285778469e4ce65847173869614814eb63f15e747234749e6697a6f7 |

FIG.5

| Certificate of Validity ||
|---|---|
| Status | Open |
| Title | Title of the Game which is given by the Promoter |
| Type | [Enum Value] // facebook comments, twitter comments, photo entry, etc. How users opt |
| Promoter | Name of whoever |
| Date and Time Created | Yyyy-mm-dd hh:mm:ss Timezone // when the certificate was created ie. When the promotion was started |
| Date and Time of the drawing | Yyyy-mm-dd hh:mm:ss Timezone // when the promotion ends and the drawing occurs |
| Verification String | ################... [Click to expand] |
| Server Nonce | **** [Hidden until after the drawing] |
| Server Seed | **** [Hidden until after the drawing] |
| Publications (Optionally shown depending on the Type) | [Hyperlinks to where the publication can be found if any] |
| Participants | ## [Click to expand] // shows the count of participants until clicked and expanded. Is updated in real time. |
| Client Seed (participant list sorted into a string) | ########## ... [Click to expand] // changes as new participants are added |
| Terms ||

FIG.6

| Certificate of Validity | |
|---|---|
| Status | Closed |
| Title | Title of the Game which is given by the Promoter |
| Type | [Enum Value] // facebook comments, twitter comments, photo entry, etc. How users opt |
| Promoter | Name of whoever |
| Date and Time Created | Yyyy-mm-dd hh:mm:ss Timezone // when the certificate was created ie. When the promotion was started |
| Date and Time of the drawing | Yyyy-mm-dd hh:mm:ss Timezone // when the promotion ends and the drawing occurs |
| Verification String | ########### ... [Click to expand] |
| Server Nonce | ########### ... [Click to expand] |
| Server Seed | ########### ... [Click to expand] |
| Publications (Optionally shown depending on the Type) | [Hyperlinks to where the publication can be found if any] |
| Participants | ## [Click to expand] // shows the count of participants until clicked and expanded. Is updated in real time. |
| Client Seed (participant list sorted into a string) | ########### ... [Click to expand] // changes as new participants are added |
| HASH(Client Seed + "," + Server Seed) | ########### ... [Click to expand] |
| Winner(s) and Alternate(s) | ########### ... [Click to expand] |
| Terms | |

FIG.7

| Last 8 Characters of the Hash | 6697a6f7 |
|---|---|
| Convert to from base 16 to base 10 | 1721214711 |

| Random number % ( Number of Users ) | 1721214711 % 20 = 11 |
|---|---|
| Lookup User by Random Index Value | User[11] = kipalthaus |

METHOD AND SYSTEMS FOR SELECTING A WINNER OF A COMPETITION

FIELD OF INVENTION

The present invention relates generally to the fields of trustless algorithms and computer-implemented lotteries. More specifically, the present invention relates to a verifiably random method of selecting a winner from a group of participants.

BACKGROUND

There are many scenarios in the modern world where a random draw to select a winner from a number of participants is desired, such as for example in game shows and promotional events. Such competitions are often high stakes, with large numbers of users entering and very large rewards, with the draw typically being carried out in a public setting or on television where a game host draws numbered balls or ticket stubs at random to determine a winner. Other scenarios include promotions by start up companies wishing to increase their visibility and obtain a market share. Both situations place a high requirement of trust between the participants and the promoter or game producers.

Traditionally, certificates of validity from trusted third parties have been used in such promotional competitions and lottery/raffle based games to certify that the drawing of the result was indeed random, however there is no actual provable way of third parties verifying the result was random and fair. Furthermore, physical systems such as those on game shows are inherently ope to tampering as humans can interact with them.

It is within this context that the present invention is provided.

SUMMARY

The present disclosure provides a method for randomly selecting a winner from a group of participants which is verifiably random, removing the requirement of a trusted third party in competitions such as lotteries. Also provided are processing systems and architectures for implementing the method.

Participants are thus no longer required to trust a particular third party's word that the result of the draw was random, they can verify the results themselves once the competition has concluded and the information is revealed. Furthermore, as the method is computer-implemented, the scale at which such competitions can be carried out is orders of magnitude greater than that at which physical draws can account for.

Thus, according to an aspect of the present disclosure there is provided a computer-implemented method of selecting a winner of a competition by a processor, the method comprising: (a) receiving a competition request comprising one or more competition parameters including a start date parameter and a run-time parameter; (b) generating a verification string by taking the hash of a cryptographic nonce comprising zero or more characters appended to a server seed; (c) creating a certificate of validity comprising the verification string; (d) publishing the certificate of validity on a public register; (e) determining that an amount of time equal to the run-time parameter has elapsed since the start time; (f) in response to the determination, requesting user data for one or more competition participants; (g) assigning each of the one or more competition participants an integer; (h) generating a determination string by taking the hash of a client seed created based on the user data for the one or more competition participants appended to the server seed; (i) calculating a determination integer based on the determination string; (j) selecting a participant having an assigned integer corresponding to the determination integer as the winner of the competition; and (k) adding the user data of the winner of the competition to the certificate of validity.

In some embodiments, the cryptographic nonce is an initial random state comprising one or more randomly generated characters.

The method may further comprise, subsequent to step (j) adding the server seed to the certificate of validity.

In some embodiments, the method may further comprise, subsequent to step (d), communicating to the sender of the competition request that the certificate of validity is viewable on the public register.

In some embodiments, the verification string and determination string are in base 16 character format. Furthermore, calculating the determination integer may comprise converting the determination string to base 10 and taking the modulo of the resultant number with the number of participants to generate an integer between 1 and the number of participants.

In some embodiments, the user data comprises a unique identifier for each user, and the client seed is created by appending the user identifiers for the one or more participants together in a string. The user data may also further comprise additional seed data associated with each participant, the additional seed data comprising at least a timestamp associated with each participant based on the time that participant opted into the competition, and wherein the additional seed data is also included in the client seed.

In some embodiments, the method further comprises selecting one or more additional winners by, subsequent to step (j), removing the user data for the participant that was selected as the winner from the user data and repeating steps (g)-(j).

BRIEF DESCRIPTION OF THE DRAWINGS

Various embodiments of the invention are disclosed in the following detailed description and accompanying drawings.

FIG. 2 illustrates an example method of generating a verification string according to the disclosed method.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Figure 1:
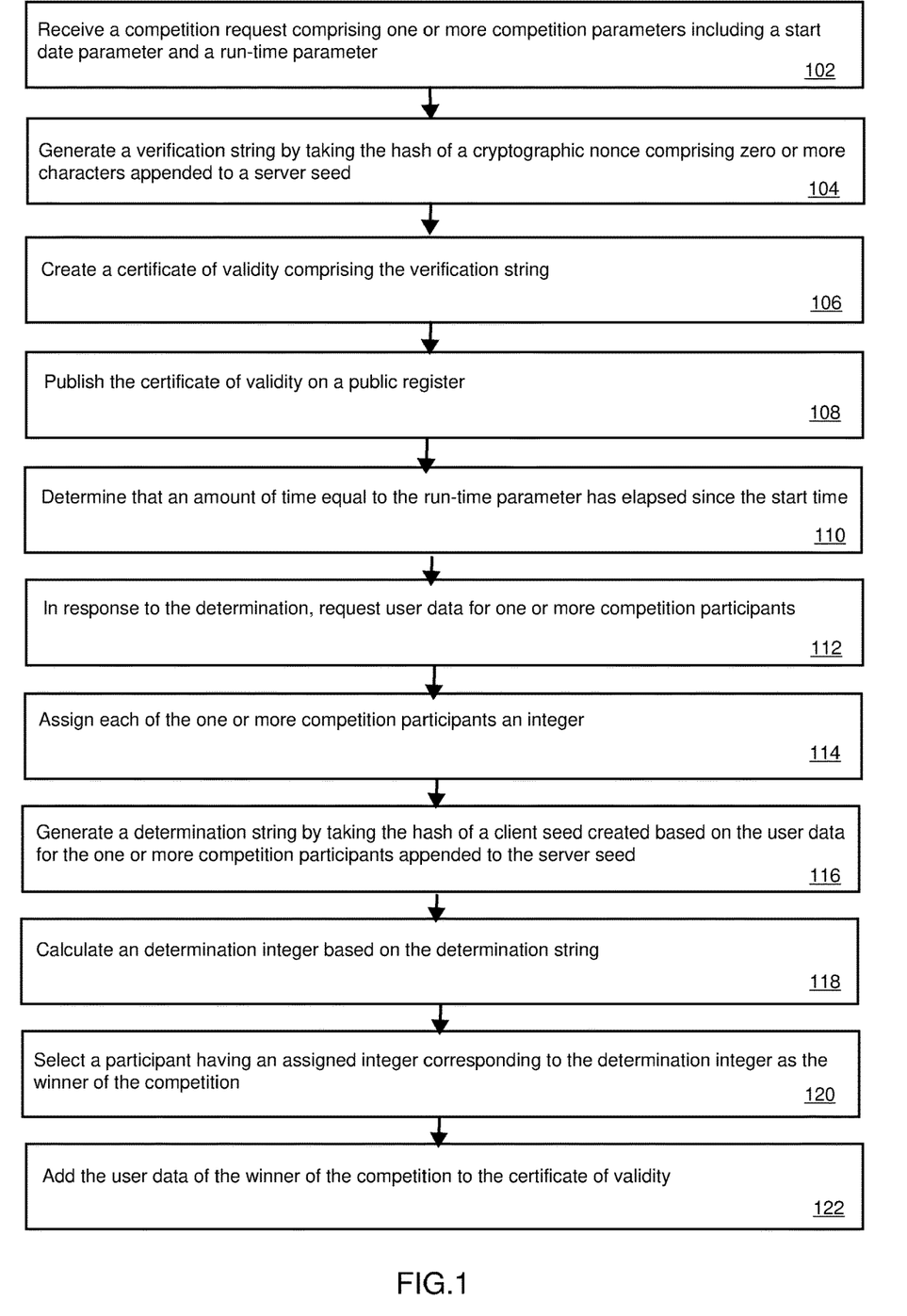
FIG. 1 illustrates a flow chart of the core steps of the disclosed method.

The terminology used herein is for the purpose of describing particular embodiments only and is not intended to be limiting of the invention. As used herein, the term "and/or" includes any combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Referring to FIG. 1, a flow chart of the core steps of the disclosed method is shown. The method is described as being carried out by a single processor co-operating with one or more servers from which information about participants is received in the form of user data, however this is merely an example and not intended as limiting. The invention can be carried out using any suitable hardware configuration including distributed/cloud processing setups.

Thus, in accordance with the method, a first step 102 involves, receiving a competition request comprising one or more competition parameters including a start date parameter and a run-time parameter. The competition request may be sent by a promoter wishing to implement a giveaway in order to increase their public profile and gain users, for example. In some embodiments such promoters may be able to send the competition request on a social network or other type of platform by sending a message to a profile associated with the processor configured to carry out the disclosed method, however once more this is merely an exemplary set-up, the method is platform agnostic and generally only requires that a competition request can be received and user data for a plurality of participants obtained.

In a second step 102 involves generating a verification string by taking the hash of a cryptographic nonce comprising zero or more characters appended to a server seed. The server seed is a string of characters generated by the processor carrying out the method and which is noted for later use in determining the winner of a competition. It is thus necessary to keep the server seed hidden until the selection of the winner of the competition has concluded. Methods of generating semi and fully random seeds are well known to those skilled in the art, such as for example carrying out a random number operation using a variable such as the operating time of the processor.

The cryptographic nonce is an optional feature, hence being "zero or more characters" which is used to strengthen the security of the system and reduce the chances that the hidden information, the server seed, can be reverse engineered from the resulting hash.

In one example, illustrated in FIG. 2, a cryptographic nonce is used which is an initial random state comprising one or more random UTF-8 characters concatenated together into a single string. In the illustrated example, the server seed is a positive number, also comprised of random UTF-8 characters concatenated together into a single string.

These two random strings are appended together and hashed using any suitable cryptographic hashing function to create a verification string, so named because it can later be used to prove unequivocally that the method for selecting the winner of a competition was carried out in a fair and truly random fashion. Of course, the initial random state cryptographic nonce is also kept hidden until after the conclusion of the method for selecting a winner. The resultant verification string, however is made public knowledge from the start date of the competition as is explained below.

Any suitable cryptographic hashing function may be used in step 102 of FIG. 1. Requirements for suitable hashing functions are as follows: they must be deterministic, meaning that the same input string always results in the same hash; it must be possible to compute the hash value for any given message relatively quickly; it must be infeasible to predict the hash value for a given input string; no two different input strings can yield the same hash value; and finally a small change to an input string should change the resultant hash value so extensively that the new hash value appears uncorrelated with the old hash value. Preferably, the hashing function is a standard hashing function accessible through various third party websites such that members of the public can use those third parties to verify the fairness of the competition method upon completion. In the illustrated examples of the present disclosure the SHA-512 hashing function is used.

Figure 6:
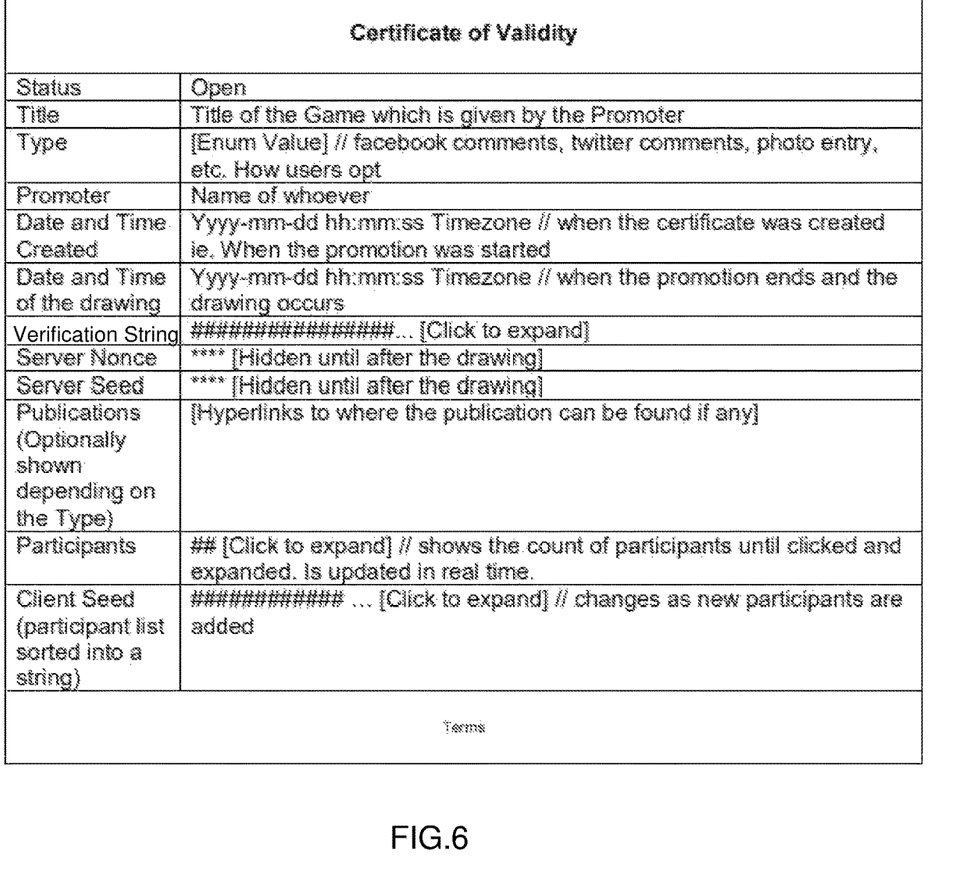
FIG. 6 illustrates an example layout for a certificate of validity associated with a given competition prior to the conclusion of the competition carried out according to the disclosed method.
Figure 7:
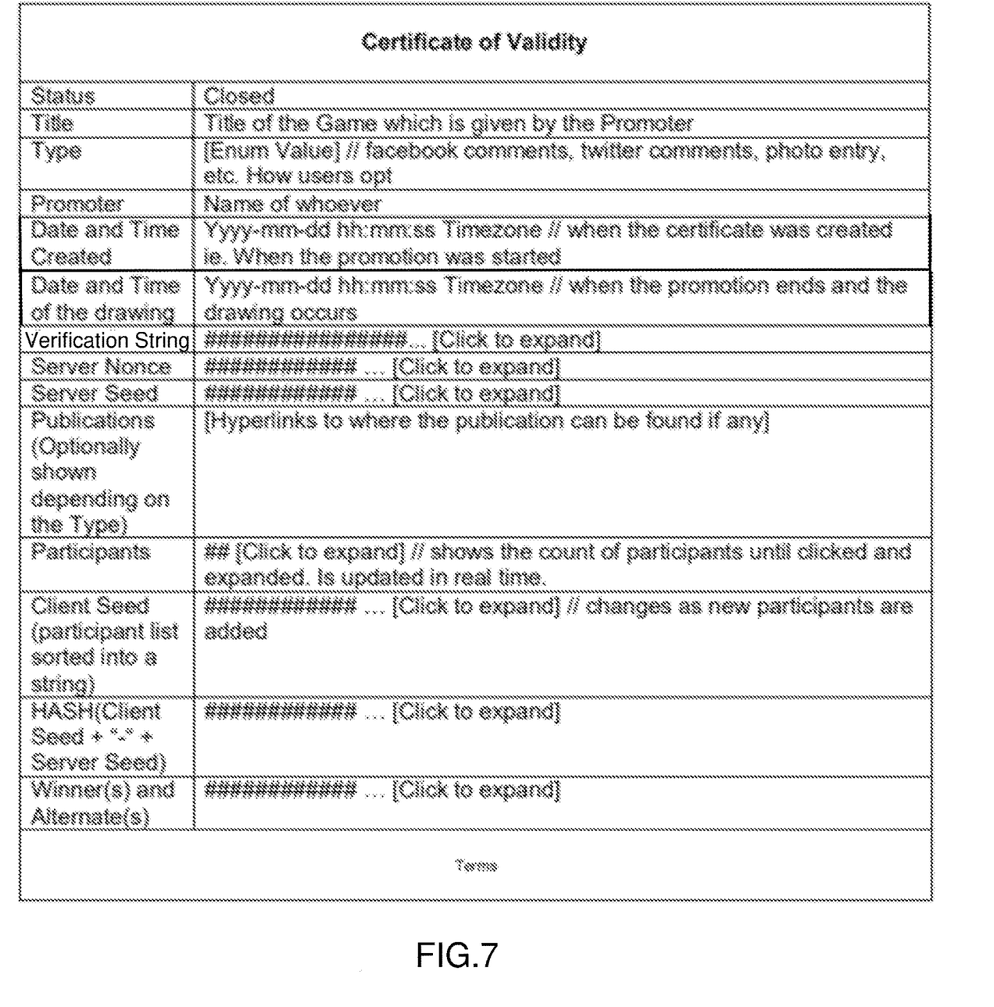
FIG. 7 illustrates the certificate of validity of FIG. 6 having been updated with information after the conclusion of the competition carried out according to the disclosed method.

Referring back to FIG. 1, in a third step 106 the processor creates a digital certificate of validity for the competition request. As mentioned previously, a certificate of validity is traditionally used to certify that a random draw for a group of participants was carried out fairly. The digital certificate of validity serves the same purpose. It comprises information relating to the competition event, in particular the verification string determined in step 104, which can later be used to prove that the server seed used to generate the verification string was the same server seed used to choose a winner of the competition. An example format for a digital certificate of validity is shown during and after closing of a given competition in FIGS. 6 and 7, respectively.

A fourth step 108 involves publishing the digital certificate of validity created for the given competition request to a public register. In some examples a dedicated website comprising a history of various competitions and their associated certificates of validity may be provided for this purpose. The verification seed must be publicly viewable on the register, and the cryptographic nonce and server seed must be hidden from viewing until conclusion of the competition. This published certificate of validity, which may also display various data relating to the competition such as the status, title, identity of the promoter, etc, effectively replaces the trusted third party in traditional random drawing systems.

At the point the certificate of validity is published on the registry, the promoter may be notified as such so that they can direct users they wish to opt-in to the competition to the registry to view the verification string. For example, if the promoter is running the competition via a social networking platform, a link to the relevant digital certificate of validity may be posted on the platform for them, or sent to them as a private message for them to share with potential participants.

Once the certificate of validity has been posted publicly, unless it is posted in advance of the start date of the competition opt-in window for some reason, the processor carrying out the disclosed method will begin to track the time of the competition using the parameters from the competition request, determining that the competition opt-in window should have ended when an amount of time equal to the competition run-time has elapsed since the competition start date.

Thus, a fifth step 110 of the method involves determining that an amount of time equal to the run-time parameter has elapsed since the competition start time.

A sixth step 112 then involves, in response to the determination at step 108, requesting user data for all the participants that have opted-in to the competition during the run-time window. For example, if the competition is being run via a social media platform then a request would be sent to the server managing the social media platform for user data for all the participants having met any opt-in conditions set by the promoter. Examples of opt-in conditions for social media platforms include determining which users of the platform have interacted publicly with a competition post and thus created a trackable record such as following, commenting, Liking, retweeting, or sharing the post. In such examples the promoter could also enact conditional opt-ins by prompting users wishing to participate to correctly answer a question by writing into the comments.

Alternatively, a promoter may be running the competition themselves, and the request may be sent to whichever computing entity the promoter used to send the original competition request. It is important to emphasise that the method is system agnostic, and is not limited to a particular entity or scheme for running a competition.

Once the user data for each of the participants of the competition has been received, a seventh step 114 involves assigning an integer to each of the participants. The participants information may be formatted prior to this step, such as for example if the user data comprises a unique user identifier for each participant, ordering the participants in A-Z alphabetical order by their unique user identifiers.

Figure 3:
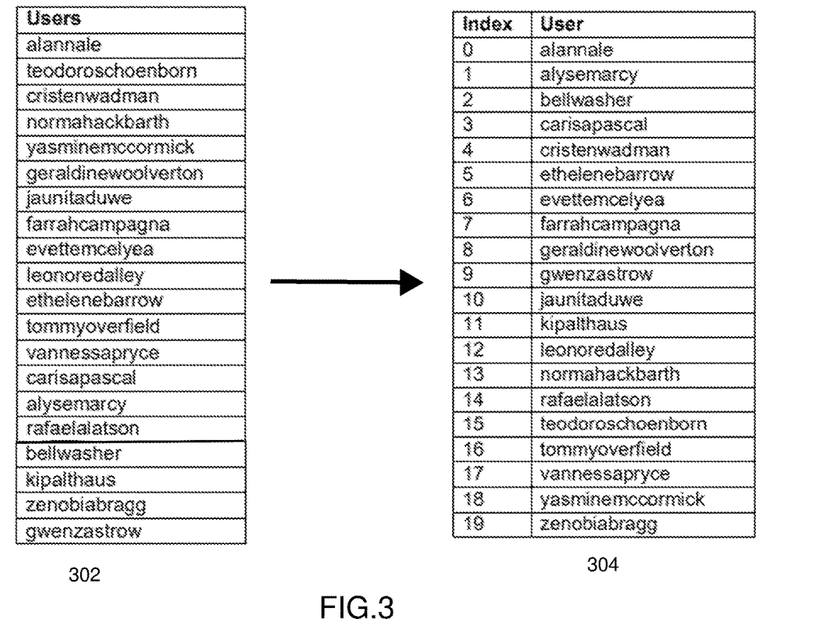
FIG. 3 illustrates an example method of formatting a set of user data to assign integers to a plurality of participants in a contest according to the disclosed method.

Such a formatting and assigning operation is shown using an example set of twenty user identifiers in FIG. 3, where an unordered dataset 302 for twenty users is received and formatted into an ordered data set 304, with the participants then being assigned integers from 0-19.

Referring back to FIG. 1, a subsequent eight step 116 involves generating a determination string for selecting the winner of the competition from among the entered participants. This is done by first creating a client seed based on the set of user data for the competition participants.

Figure 4:
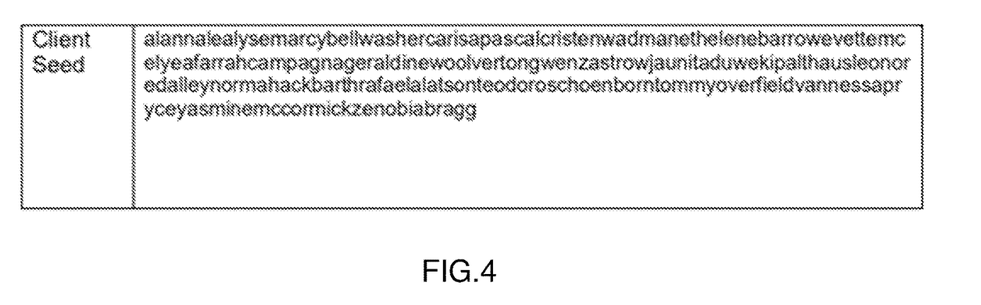
FIG. 4 illustrates an example client seed generated based on the formatted user data of FIG. 3.

FIG. 4 illustrates a basic client seed formed by simply appending all of the unique user identifiers from FIG. 3 together in one string of characters, ordered as they were formatted, in the A-Z order. However more complex seeds could be generated using additional parameters contained in the user data. This may be beneficial in some cases as the more data contained in the user data and used to generate the client seed, the greater the entropy of the resulting seed. Examples of other information that could be appended to or inserted into the client seed is user opt-in time or personal details such as date of birth.

Regardless of the actual method of generating the client string, the method should be public information for increased transparency and to help with later verification of the fairness of the result. For example, the method could be stated on the certificate of validity. Alternatively, as illustrated in the example certificates of validity shown in FIGS. 6 and 7, the client seed used may simply be available to view publicly.

Figure 5:
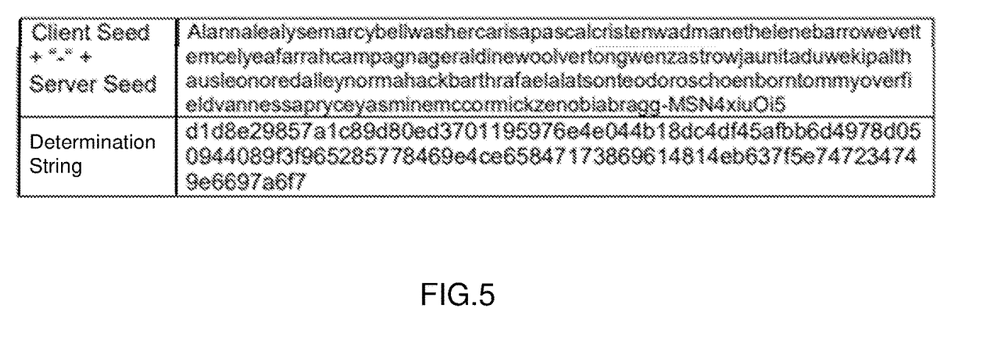
FIG. 5 illustrates an example method of generating a determination string based on the client seed of FIG. 4.

Once the client seed has been created using the user data, the server seed is appended to it, and a determination string is created from the appended version using the same cryptographic hashing method used to generate the verification seed. An example of this operation using the user data of FIGS. 3 and 4 is shown in FIG. 5.

Referring back to FIG. 1, in a ninth step 118, a determination integer is calculated using the determination string. The determination integer must match one of the integers assigned to the participants in step 114 of the method, and can therefore be used as an index to select the winner from a formatted list such as that shown in FIG. 3.

One example method for converting the determination string to a determination integer in the correct number range is to convert the string to base 10 if it is not already in base 10, and then to take the modulo of the base 10 version using the total number of participants.

Figure 8:
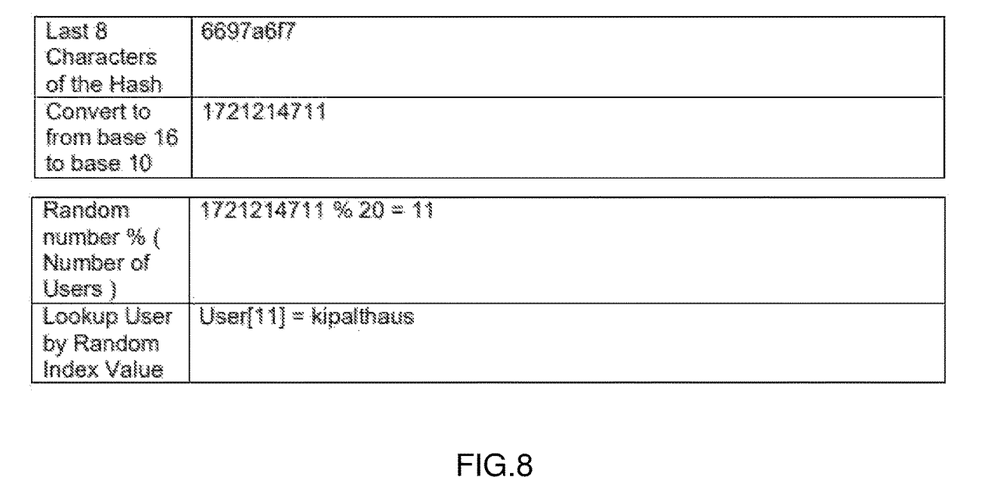
FIG. 8 illustrates an example method of determining a competition winner based on the verification string determined in FIG. 5.

The step of converting from base 16 to base 10 format can be taxing for some processors, and some machines can only do this precisely for numbers up to $2^{32}-1=4294967295$, therefore in some examples only a portion of the determination string may be converted such as the last 8 characters of the determination string, with the modulo operation then being performed on the converted base 10 version of the last 8 characters to determine the final integer used as an index to select the winner of the competition. This exact operation is illustrated in FIG. 8 using the last 8 characters of the determination string shown in FIG. 5.

Referring back to FIG. 1, the final two steps of the method involve a tenth step 120 of selecting a participant having an assigned integer corresponding to the calculated determination integer and an eleventh step 122 of adding that participant to the certificate of validity for that respective competition so that they are publicly declared the winner of the competition.

At this stage, the server seed is also made public knowledge alongside the initial random state nonce, if one was used. Third parties therefore have all the information necessary to replicate the results of the competition using standard cryptographic hashing functions, making the process for selecting a random winner provably fair.

It is worth noting that the number of winners of a given competition can easily be extended by, after selecting a first winner, removing the participant name other information from the user data, adjusting the number of participants, and repeating steps 114 to 122. This can be done as many times as necessary, and can order the winners in a ranking of the order they won in if desired.

Related systems could also help managing the handling of prize allocation and delivery between the promoter and the one or more winners of the competition.

Also provided herein are possible system architectures for implementing the method. While having been described specifically with respect to a single processor communicating with one or more servers, it should be understood that the operations described herein may be carried out by any processor-based system.

Figure 9:
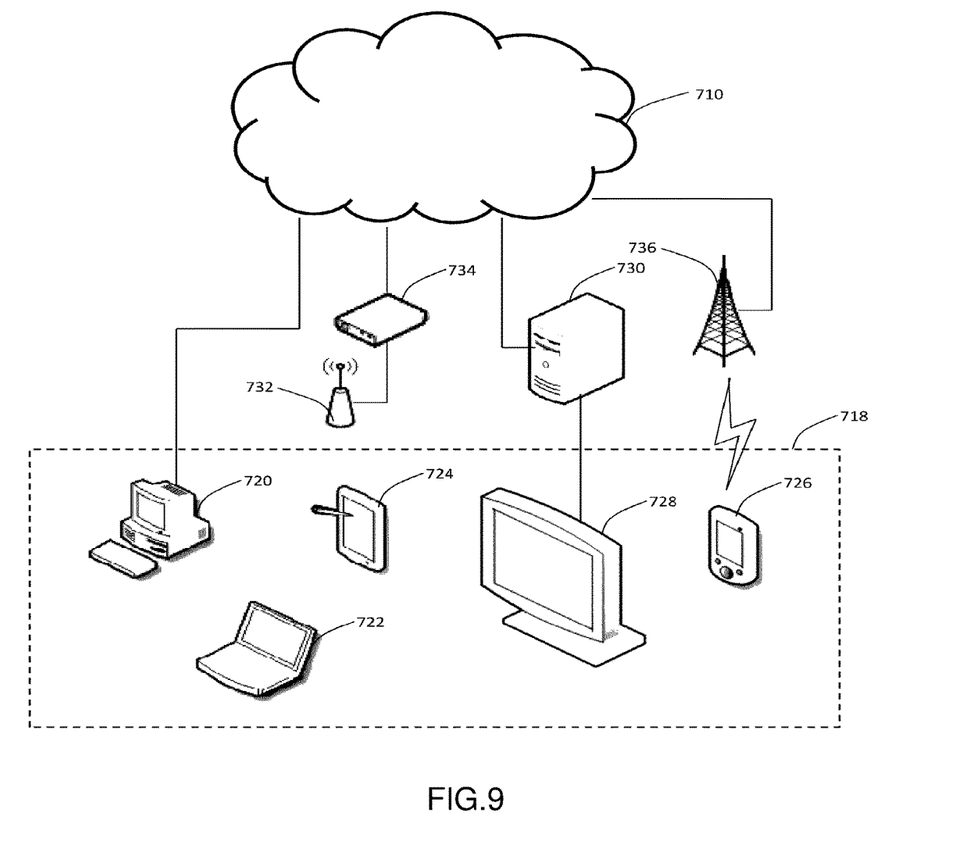
FIG. 9 illustrates an illustrative networked service offering over which the methods and systems of the invention may be implemented.

Referring to FIG. 9, there is shown an illustrative networked service offering that includes a server based service offering or a cloud based service offering which may be used to implement the method of the present disclosure. The illustrative networked or cloud service 710 is configured to communicate with client devices 718. The illustrative client devices include a personal computer 720, a laptop 722, a tablet computer 724, a smartphone 726, and a display 728 that has a wired connection to a networked computer 730. The clients 718 may be operationally coupled to a wide area network (WAN) such as the Internet with a wireless connection. The wireless clients may be communicatively coupled to the WAN via a Wi-Fi (or Bluetooth) access point 732 that is communicatively coupled to an illustrative modem 734, which is communicatively coupled to the WAN. The wireless clients may also be communicatively coupled to the WAN using a proprietary carrier network that includes illustrative communication tower 736.

Figure 10:
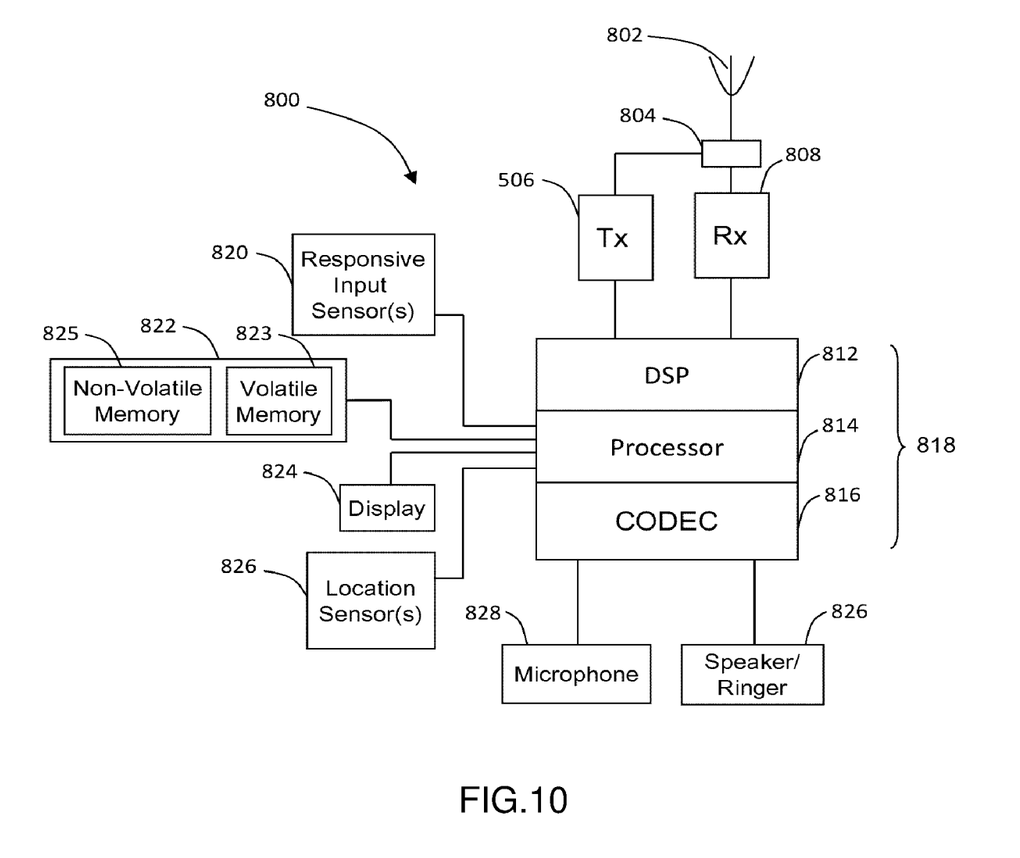
FIG. 10 illustrates an illustrative wireless device offering over which the methods and systems of the invention may be implemented.

Referring to FIG. 10, there is shown the electrical components for an illustrative wireless device 800. For purposes of this patent, the illustrative wireless device 800 is a multimode wireless device that comprises a first antenna element 802 that is operatively coupled to a duplexer 804, which is operatively coupled to a multimode transmitter module 806, and a multimode receiver module 808.

An illustrative control module 818 comprises a digital signal processor (DSP) 812, a processor 814, and a CODEC 816 that are communicatively coupled to the transmitter 806 and receiver 808. It shall be appreciated by those of ordinary skill in the art that the transmitter module and receiver module are typically paired and may be embodied as a transceiver. The illustrative transmitter 806, receiver 808, or transceiver is communicatively coupled to antenna element 802.

The DSP 812 may be configured to perform a variety of operations such as controlling the antenna 802, the multimode transmitter module 806, and the multimode receiver module 808. The processor 814 is operatively coupled to a responsive input sensor 820 such as a keypad or a touch screen.

The processor 814 is also operatively coupled to a memory 822, a display 824, and a sensor 826. The sensor 826 may be used to determine an indoor and outside location for the illustrative wireless device.

Additionally, the processor 812 is also operatively coupled to the CODEC module 816 that performs the encoding and decoding operations and is communicatively coupled to a speaker 826, and a microphone 828. The CODEC module 816 is also communicatively coupled to the display 824 and provides the encoding and decoding operations for video.

The memory 822 includes two different types of memory, namely, volatile memory 823 and non-volatile memory 825. The volatile memory 823 is computer memory that requires power to maintain the stored information, such as random access memory (RAM). The non-volatile memory 825 can retain stored information even when the wireless communication device 800 is not powered up. Some illustrative examples of non-volatile memory 825 include flash memory, ROM memory, and hard drive memory.

Wireless device 800 may be a mobile handset, mobile phone, wireless phone, portable cell phone, cellular phone, portable phone, a personal digital assistant (PDA), a tablet, a portable media device, a wearable computer, or any type of mobile terminal which is regularly carried by an end user and has all the elements necessary for operation in a wireless communication system. The wireless communications include, by way of example and not of limitation, CDMA, WCDMA, GSM, UMTS, or any other wireless communication system such as wireless local area network (WLAN), Wi-Fi or WiMAX.

It should be understood that the operations described herein may be carried out by any processor comprising a distributed element. In particular, the operations may be carried out by, but are not limited to, one or more computing environments used to implement the method such as a data center, a cloud computing environment, a dedicated hosting environment, and/or one or more other computing environments in which one or more assets used by the method re implemented; one or more computing systems or computing entities used to implement the method; one or more virtual assets used to implement the method; one or more supervisory or control systems, such as hypervisors, or other monitoring and management systems, used to monitor and control assets and/or components; one or more communications channels for sending and receiving data used to implement the method; one or more access control systems for limiting access to various components, such as firewalls and gateways; one or more traffic and/or routing systems used to direct, control, and/or buffer, data traffic to components, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the method; one or more databases used to store data; one or more internal or external services used to implement the method; one or more backend systems, such as backend servers or other hardware used to process data and implement the method; one or more software systems used to implement the method; and/or any other assets/components in which the method is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

As used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

Unless specifically stated otherwise, as would be apparent from the above discussion, it is appreciated that throughout the above description, discussions utilizing terms such as, but not limited to, "activating", "accessing", "adding", "applying", "analyzing", "associating", "calculating", "capturing", "classifying", "comparing", "creating", "defining", "detecting", "determining", "eliminating", "extracting", "forwarding", "generating", "identifying", "implementing", "obtaining", "processing", "providing", "receiving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the method and systems for implementing the method have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A computer-implemented method of selecting a winner of a competition by a processor, the method comprising:
   a. electronically receiving, by at least one computer processor, a competition request comprising one or more competition parameters including a start date parameter and a run-time parameter from a user input via a computerized input device;
   b. electronically generating, by at least one computer processor, a verification string by taking the hash of a cryptographic nonce comprising zero or more characters appended to a server seed;
   c. electronically creating, by at least one computer processor, a certificate of validity comprising the verification string;
   d. electronically publishing, by at least one computer processor, the certificate of validity on an online platform viewable by public;
   e. electronically determining, by at least one computer processor, that an amount of time equal to the run-time parameter has elapsed since the start time;
   f. in response to the determination, electronically requesting, by at least one computer processor, user data for one or more competition participants;
   g. electronically assigning, by at least one computer processor, each of the one or more competition participants an integer;
   h. electronically generating, by at least one computer processor, a determination string by taking the hash of a client seed created based on the user data for the one or more competition participants appended to the server seed;
   i. electronically calculating, by at least one computer processor, a determination integer based on the determination string;
   j. electronically selecting, by at least one computer processor, a participant having an assigned integer corresponding to the determination integer as the winner of the competition; and
   k. electronically adding, by at least one computer processor, the user data of the winner of the competition to the certificate of validity.

2. The computer-implemented method according to claim 1, wherein the cryptographic nonce is an initial random state comprising one or more randomly generated characters.

3. The computer-implemented method according to claim 1, wherein the method further comprises, subsequent to step (j) adding the server seed to the certificate of validity.

4. The computer-implemented method according to claim 1, wherein the method further comprises, subsequent to step (d), communicating to the sender of the competition request that the certificate of validity is viewable on the public register.

5. The computer-implemented method according to claim 1, wherein the verification string and determination string are in base 16 character format.

6. The computer-implemented method according to claim 5, wherein the calculating the determination integer comprises converting the determination string to base 10 and taking the modulo of the resultant number with the number of participants to generate an integer between 1 and the number of participants.

7. The computer-implemented method according to claim 1, wherein the user data comprises a unique identifier for each user, and wherein the client seed is created by appending the user identifiers for the one or more participants together in a string.

8. The computer-implemented method according to claim 7, wherein the user data further comprises additional seed data associated with each participant, the additional seed data comprising at least a timestamp associated with each participant based on the time that participant opted into the competition, and wherein the additional seed data is also included in the client seed.

9. The computer-implemented method according to claim 1, wherein the method further comprises selecting one or more additional winners by, subsequent to step (j), removing the user data for the participant that was selected as the winner from the user data and repeating steps (g)-(j).

10. A system, comprising:
one or more hardware computer processors configured with computer-executable instructions that, when executed, cause the one or more computer hardware processors to:
a. receive a competition request comprising one or more competition parameters including a start date parameter and a run-time parameter from a user input;
b. generate a verification string by taking the hash of a cryptographic nonce comprising zero or more characters appended to a server seed;
c. create a certificate of validity comprising the verification string;
d. publish the certificate of validity on a public register an online platform viewable by public;
e. determine that an amount of time equal to the run-time parameter has elapsed since the start time;
f. in response to the determination, request user data for one or more competition participants;
g. assign each of the one or more competition participants an integer;
h. generate a determination string by taking the hash of a client seed created based on the user data for the one or more competition participants appended to the server seed;
i. calculate a determination integer based on the determination string;
j. select a participant having an assigned integer corresponding to the determination integer as the winner of the competition; and
k. add the user data of the winner of the competition to the certificate of validity.

11. The system according to claim 10, wherein the cryptographic nonce is an initial random state comprising one or more randomly generated characters.

12. The system according to claim 10, wherein the one or more hardware computer processors configured with the computer-executable instructions that, when executed, further cause the one or more computer hardware processors to:
subsequent to step (j), add the server seed to the certificate of validity.

13. The system according to claim 10, wherein the one or more hardware computer processors configured with the computer-executable instructions that, when executed, further cause the one or more computer hardware processors to:
subsequent to step (d), communicate to the sender of the competition request that the certificate of validity is viewable on the public register.

14. The system according to claim 10, wherein the verification string and determination string are in base 16 character format.

15. The system according to claim 14, wherein the calculation of the determination integer comprises converting the determination string to base 10 and taking the modulo of the resultant number with the number of participants to generate an integer between 1 and the number of participants.

16. The system according to claim 10, wherein the user data comprises a unique identifier for each user, and wherein the client seed is created by appending the user identifiers for the one or more participants together in a string.

17. The system according to claim 16, wherein the user data further comprises additional seed data associated with each participant, the additional seed data comprising at least a timestamp associated with each participant based on the time that participant opted into the competition, and wherein the additional seed data is also included in the client seed.

18. The system according to claim 10, wherein the one or more hardware computer processors configured with the computer-executable instructions that, when executed, further cause the one or more computer hardware processors to:
subsequent to step (j), remove the user data for the participant that was selected as the winner from the user data and repeating steps (g)-(j).

* * * * *